Figure 1:
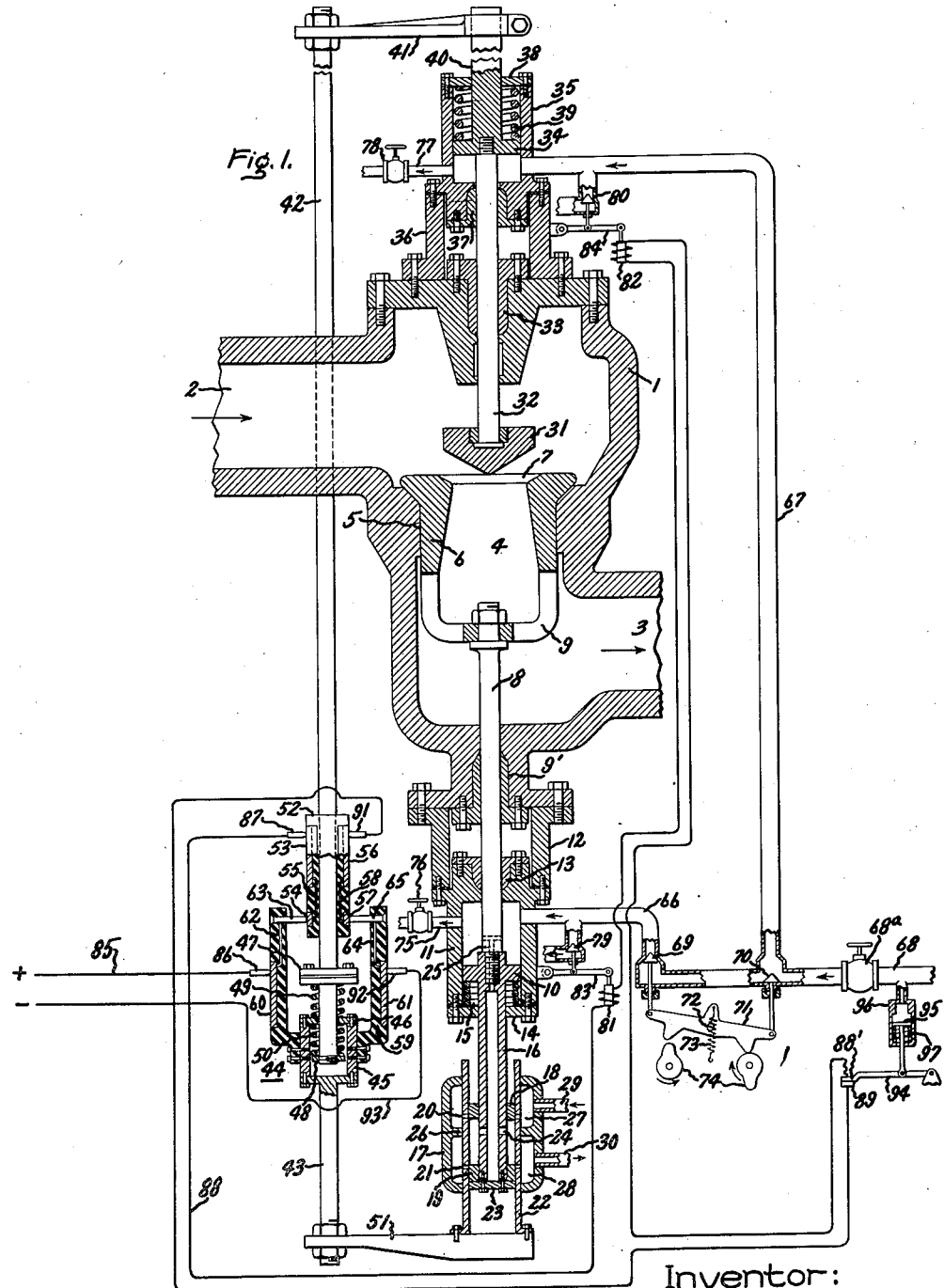

Nov. 17, 1942.    M. O. TROY, JR    2,302,404
VALVE
Filed April 17, 1941    2 Sheets-Sheet 1

Inventor:
Matthew O. Troy Jr.,
by Harry E. Dunham
His Attorney.

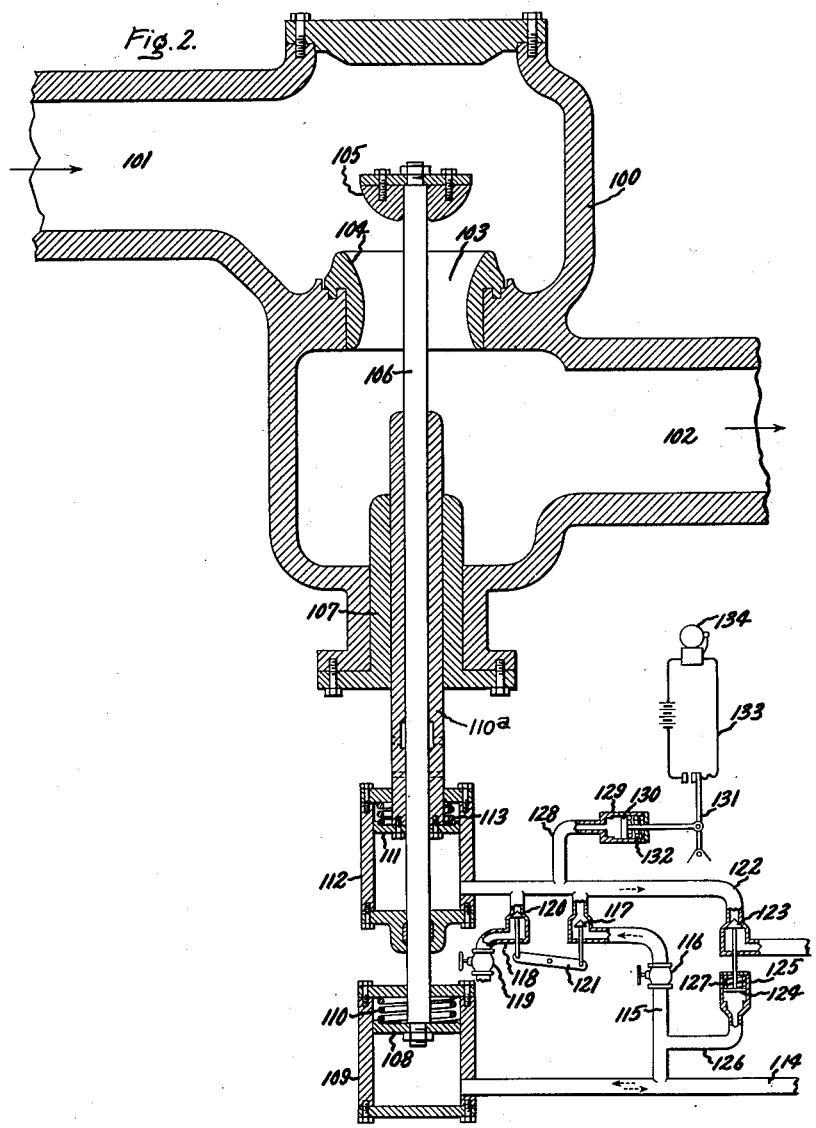

Patented Nov. 17, 1942

2,302,404

UNITED STATES PATENT OFFICE 2,302,404

VALVE

Matthew O. Troy, Jr., Schenectady, N. Y., assignor to General Electric Company, a corporation of New York Application April 17, 1941, Serial No. 389,035

8 Claims. (Cl. 137—153)

The present invention relates to valves, particularly to stop valves or emergency valves which normally are open and are closed automatically upon the occurrence of abnormal operating conditions. During normal use, such valves may not be called upon to operate for long periods of time and difficulties have been experienced with such valves because of sticking and failing to operate which may be caused by deposits forming on parts of the valve, such as the valve disk, the valve seat, or the valve stem.

The object of my invention is to provide an improved construction and arrangement in a valve whereby the above referred to difficulties are overcome and for a consideration of what I believe to be novel and my invention, attention is directed to the following specification and the claims appended thereto.

My invention is especially applicable to stop valves or emergency valves such as are used on elastic fluid turbines to shut off the supply of fluid to the turbine in case of an abnormal operating condition of the turbine and I have elected to illustrate and describe my invention as applied to a valve of this type. It is to be understood, however, that this is only by way of example and that my invention may be applied to various types of valves and to valves for various purposes.

In the drawings, Fig. 1 is a sectional view of a valve embodying my invention, the view being in part diagrammatic, and Fig. 2 is a similar view of a modification.

Referring to Fig. 1 of the drawings, I indicates a valve body or casing having an admission opening 2 and a discharge opening 3 connected by a passage 4 defined by an annular wall 5. Supported in annular wall 5 is a sleeve 6 having a valve seat 7. Sleeve 6 is connected to and supported upon the upper end of a valve stem 8 through the intermediary of a frame comprising spaced ribs 9. The valve stem 8 extends through a stuffing box 9' in the valve body and at this lower end is connected to a piston 10. The piston 10 is located in a cylinder 11 attached to the valve body by a ring 12. The valve stem 8 passes through the upper cylinder head through a suitable stuffing box 13. Located between piston 10 and the lower cylinder head 14 of cylinder 11 is a compression spring 15 which tends to bias piston 10 toward the upper end of cylinder 11. Connected to the lower side of piston 10 is a valve stem extension 16 which extends out through cylinder head 14 and projects into a pilot valve casing 17 fixed on a suitable stationary support (not shown). Fixed on valve stem extension 16 are spaced valve rings 18 and 19 which control respectively ports 20 and 21 in a sliding sleeve 22 located in pilot valve casing 17 surrounding the extension 16. Valve stem extension 16 is hollow and is closed at its lower end by a plate 23. The interior of valve stem extension 16 is connected to the space between valve members 18 and 19 by ports 24. The space within the valve stem extension is connected to the interior of cylinder 11 above piston 10 by a passage 25. An annular wall 26 divides the space between the pilot valve casing 17 and sleeve 22 into two chambers, an upper chamber 27 and a lower chamber 28. Upper chamber 27 is connected by a pipe 29 to a suitable supply of fluid pressure, such as oil for example. Lower chamber 28 is connected by a pipe 30 to a suitable discharge tank which may be the supply tank from which pipe 29 is supplied by a suitable pump with fluid under pressure.

In valve casing 1 for cooperation with valve seat 7 is a valve disk 31 carried on the lower end of a valve stem 32. Valve stem 32 projects out through a suitable stuffing box 33 in the valve body and at its upper end is connected to a piston 34 located in a cylinder 35. Cylinder 35 is supported on the valve casing by a ring 36 and its lower head is provided with a suitable stuffing box 37 through which valve stem 32 passes. The upper end of cylinder 35 is closed by a head 38 between which and piston 34 is arranged a compression spring 39 which tends to bias piston 34 toward the lower end of cylinder 35. Connected to the upper side of piston 34 is a valve stem extension 40 which extends out through head 38 and is rigidly connected at its upper end to one end of an arm 41. The other end of arm 41 is fixed to a connecting rod 42. The lower end of rod 42 is connected to the upper end of a rod 43 through the intermediary of a spring connection 44. The spring connection 44 comprises a sleeve 45 carried on the upper end of rod 43 and provided with a head 46 through which the lower end of rod 42 projects into sleeve 45. On the lower end of rod 42 are two spaced abutments 47 and 48, abutment 47 being located above sleeve 45 and abutment 48 being located in the sleeve. Arranged between abutments 47 and 48 and the head or cover plate 46 are springs 49 and 50 which serve to center the connection between rods 42 and 43, as shown in the drawings. Rod 43 is rigidly connected to pilot valve sleeve 22 by an arm 51 which at one end is fixed to the lower end of rod 43 and at the other end to sleeve 22.

Fixed on rod 42 is a sleeve of insulating material 52. On one side of sleeve 52 are two spaced strip contacts 53 and 54 connected by a conductor 55, the upper contact being longer than the lower contact. On sleeve 52 diametrically opposite contact strips 53 and 54 are two similar contact strips 56 and 57 connected by a conductor 58. Fixed to sleeve 45 is an insulating cylinder 59 on opposite sides of which are contact strips 60 and 61. The contact strip 60 is connected by a conductor 62 to a pin 63 which normally engages contact strip 54 and contact strip 61 is connected by a conductor 64 to a pin 65 which normally engages contact strip 57.

Cylinders 11 and 35 are connected in parallel by pipes 66 and 67 to a fluid pressure pipe 68 which is the pressure pipe from the turbine emergency governor. The arrangement of a turbine emergency governor in connection with a pressure pipe line is well understood and is not illustrated. It is such that normally fluid pressure is supplied through pipe 68 but when the emergency governor operates, it disconnects pipe 68 from the fluid pressure supply and connects it to a drain, thus quickly releasing the pressure in pipe 68. A known arrangement is shown, for example, in the patent to Caughey 1,931,104 issued October 17, 1933, to the assignee of my present application. In pipe 68 is a fluid flow regulating valve 68ᵃ. In pipe 66 is a shut-off valve 69 and in pipe 67 is a shut-off valve 70. Valves 69 and 70 are arranged to be alternately opened and closed by a suitable timing means. In the present instance and by way of example, the stems of valves 69 and 70 are connected to opposite ends of a walking beam 71 pivoted at 72 and provided with an over-center spring 73 and the walking beam is arranged to be tilted by a pair of cams 74 which are rotated in unison by a suitable timing mechanism (not shown). Cams 74 rotate continuously and the arrangement is such that valve 69 is closed and valve 70 open for a predetermined period of time after which the positions of the valves are reversed, valve 69 being opened and valve 70 closed. When valve 69 is closed and valve 70 is open, fluid pressure is supplied through pipe 67 to the under side of piston 34. When the positions of valves 69 and 70 are reversed, fluid pressure is supplied through pipe 66 to the upper side of piston 10.

Connected to cylinder 11 above piston 10 is a discharge pipe 75 provided with a regulating valve 76 and connected to cylinder 35 beneath piston 34 is a discharge pipe 77 provided with a regulating valve 78. Valves 76 and 78 are set to permit of the slow discharge of fluid from the respective cylinders, pipes 75 and 77 being connected with a suitable fluid tank.

In pipes 66 and 67 beyond valves 69 and 70 as regards the direction of flow are dump valves 79 and 80 which are normally closed and which when opened permit the fluid pressure on pistons 10 and 34 to be quickly relieved. Valves 79 and 80 are biased toward open position and are normally held closed by electromagnets 81 and 82, the plungers of which are connected to the respective valve stems through pivoted arms 83 and 84. The windings of electromagnets 81 and 82 are connected in series with each other and with the contacts on sleeve 52 and cylinder 59 by a circuit which may be traced as follows: from the plus side of the line through conductor 85 to a stationary contact pin 86 on which contact strip 60 slides, contact strip 60, conductor 62, contact pin 63, contact strip 54, conductor 55, contact strip 53, stationary contact pin 87 on which strip 53 slides, conductor 88, windings of electromagnets 81 and 82 to a movable contact 88', a fixed contact 89, conductor 90 to a stationary contact pin 91 similar to pin 87 and on which contact strip 56 slides, contact strip 56, conductor 58, contact strip 57, contact pin 65, conductor 64, contact strip 61, stationary contact pin 92 on which contact strip 61 slides and conductor 93 to the negative side of the line. Movable contact 88' is carried by a pivoted arm 94 to which is connected the stem of a piston 95 located in a cylinder 96, the interior of which is connected to pipe line 88 in advance of regulating valve 68ᵃ as regards the direction of flow of fluid pressure. Piston 95 is biased by a spring 97 to a position in cylinder 96 such that contact 88 is out of engagement with fixed contact 89. Normally, the fluid pressure in pipe 68 holds piston 95 in a position as shown in the drawing wherein contact 88 is in engagement with contact 89.

The operation of the arrangement shown in Fig. 1 is as follows:

Assume that fluid pressure is being supplied through pipe 68 (the emergency governor of the turbine being in normal operating position); that valve 68ᵃ is set to supply fluid pressure at the desired rate to pipes 66 and 67; that valves 76 and 78 are set to permit the escape of fluid pressure from cylinders 11 and 35 at the desired rate, and that the other parts are in the position shown, the circuit through electromagnets 81 and 82 being closed so that valves 79 and 80 are held shut. Pistons 10 and 34 have just reached their lowermost positions in their respective cylinders and the positions of valves 69 and 70 have just been reversed, valve 69 having been closed and valve 70 opened. Now fluid pressure flows through pipe 67 to the underside of piston 34, slowly raising the piston and lifting valve disk 31. At the same time, spring 15 in cylinder 11 moves piston 10 to lift valve seat 7, the fluid pressure above piston 10 being discharged through pipe 75. Valves 76 and 78 are so set that valve disk 31 and valve seat 7 will be maintained in the same relative positions, valve disk 31 being lifted at the same rate as valve seat 7. Thus the valve opening between the valve disk 31 and the valve seat 7 is maintained constant for flow of fluid through the valve. When the parts reach the upper limit of movement, timing cams 71 operate to reverse the positions of valves 69 and 70, the flow of fluid pressure through pipe 67 to cylinder 35 being shut off and the flow of fluid pressure being supplied to cylinder 11. The valve disk 31 and valve seat 7 then move in the opposite direction back to the positions shown in the drawing. Thus, as timing disks 74 rotate, the valve disk and valve seat are maintained continuously in motion. The arrangement is preferably such that the movement is slow, it being such for example that a period of time of the order of several minutes is required to move the pistons 10 and 34 from one end of their strokes to the other. Also, the arrangement is such that the movement of the valve disk and valve seat is a distance at least equal to the distance between the valve disk and seat, i. e., the distance which the valve disk and valve seat must move relatively to each other in order to close the valve. Thus, the moving parts of the valve are continuously moved a distance equal to that through which they are called upon to move when the valve closes. As a result, the contacting parts which move relatively to each other are continuously wiped across each other throughout their active length so that no deposits of foreign matter can accumulate on them to cause the valve to stick.

The pilot valve structure serves to maintain valve seat 7 spaced the desired distance from valve disk 31 so as to maintain the same valve opening. If the valve seat moves toward the valve disk, ports 20 in the pilot valve are uncovered, thus admitting fluid pressure from pipe 29 through ports 20 and 24 to cylinder 11 above piston 10, thereby moving valve seat 7 away from valve disk 31 until the positions of the parts of the pilot valve are restored. If valve seat 7 moves away from valve disk 31, then ports 21 are uncovered, permitting the fluid to discharge from cylinder 11 above piston 10 out through discharge pipe 30 whereupon spring 15 will effect a movement of the valve seat toward the valve disk until ports 21 are again covered.

During normal operation, the piston rod extension 16 which forms one moving part of the pilot valve and the sleeve 22 which forms the other moving part move together. Chambers 27 and 28 are made of a length so that ports 20 are always in communication with chamber 27 and ports 21 with chamber 28.

If one of the valve parts should stick so that there is a substantial movement of the valve disk 31 and valve seat 7 relatively to each other, either toward or away from each other, sleeve 52 and cylinder 59 will be moved relatively to each other whereby contact pins 63 and 65 will be moved from engagement with contact strips 54 and 57, thus opening the circuit through electromagnets 81 and 82. When this happens, valves 79 and 80 open quickly dumping the fluid pressure from cylinders 11 and 35, permitting springs 15 and 39 to quickly move the valve disk 31 and valve seat 7 into engagement with each other, thus closing the valve.

Also, in case the fluid pressure supplied through pipe 68 fails, for instance by the operation of the emergency governor of the turbine, the fluid pressure in cylinder 96 is relieved, thus permitting spring 97 to move piston 95 to separate contact 88' and contact 89. This likewise opens the circuit on electromagnets 81 and 82 and effects closing of the valve.

Referring to the modification of my invention shown in Fig. 2, 100 indicates a valve casing having an inlet opening 101 and a discharge opening 102 between which is located a passage 103 provided with a valve seat 104. In the valve casing is a valve disk 105 carried on the upper end of a valve stem 106, the valve disk being adapted to engage seat 104 to close the valve. Valve stem 106 extends through a suitable packing 107 and at its lower end is provided with a piston 108 which moves in a cylinder 109. Located between the upper head of the cylinder and the piston is a spring 110 which acts normally in a direction to move valve disk 105 to closed position.

Surrounding valve stem 106, where it passes through casing 100, is a sliding bushing 110a on the lower end of which is a piston 111 located in a cylinder 112. Between the upper head of cylinder 112 and piston 111 is a spring 113 which acts normally in a direction to move piston 111 toward the lower end of cylinder 112.

Connected to cylinder 109 beneath piston 108 is a fluid pressure pipe 114 corresponding to fluid pressure pipe 68 in Fig. 1. This may be the pressure pipe line from the emergency governor of a turbine, as already explained. With this arrangement, as long as the emergency governor of the turbine is in normal operating condition, fluid pressure is supplied through pipe 114 to the under side of piston 108, holding it in the position shown in the drawing to maintain the valve open. In case the fluid pressure supply in pipe 114 fails, a thing which may be caused by operation of the emergency governor, the fluid pressure under piston 108 is permitted to escape through pipe 114, permitting the valve to close.

Fluid pressure pipe 114 is connected by a branch pipe 115 to cylinder 112 beneath piston 111. In pipe 115 is a regulating valve 116 and a shut-off valve 117. This forms a fluid pressure supply pipe to cylinder 112. Connected with a pipe 115 is a discharge pipe 118 provided with a regulating valve 119 and shut-off valve 120. Valves 117 and 120 are connected to a walking beam 121 corresponding to the walking beam 71 of Fig. 1. Walking beam 121 is provided with a timing mechanism connected thereto (not shown) which may be the same as the timing mechanism shown diagrammatically in Fig. 1 for periodically reversing the positions of valves 117 and 120. Connected to pipe 115 is a discharge pipe 122 provided with a valve 123 having its stem connected to a piston 124 located in the cylinder 125, the cylinder being connected by a pipe 126 to pipe 115 in advance of valve 116 as regards the flow of fluid pressure. Valve 123 is biased toward open position by a spring 127 located between piston 124 and the head of cylinder 125. Normally, the fluid pressure in pipe 115 maintains valve 123 closed. If the fluid pressure fails, valve 123 is opened to dump the fluid pressure from beneath piston 111. Connected to pipe 115 is a pressure pipe 128 connected with a cylinder 129 in which is located a piston 130 provided with a stem connected to a circuit closer 131. Located between piston 130 and the head of the cylinder is a spring 132 which biases piston 130 toward the bottom of cylinder 129 and the circuit closer 131 to closed position. Connected to circuit closer 131 is an electrical circuit 133 connected to a suitable alarm, trip device or the like. In the present instance, it is shown as being connected to an electric bell 134. In case the pressure in pipe 115 fails, circuit closer 131 operates to close electric circuit 133 and operate whatever device or devices are connected with the circuit.

The operation of the arrangement shown in Fig. 2 is as follows:

Normally, fluid pressure is supplied through pipe 114 to hold the valve open and at the same time supply fluid pressure to pipe 115. The parts are shown in the drawing in the positions they occupy just as valves 117 and 120 are about to be reversed, the piston 111 being at the upper end of its movement. Now, when the positions of valves 117 and 120 are reversed, the supply of fluid pressure to cylinder 112 is cut off by valve 117 and permitted to escape from the cylinder through valve 120. Valves 116 and 119 are set to effect the supply and discharge of fluid pressure at the desired rates. Spring 113 now forces piston 111 down, the fluid pressure being discharged through valve 120. As a result, the sliding bushing 110a moves down relatively to stem 106. When it reaches the lower end of its movement, the positions of valves 117 and 120 are reversed after the manner explained in connection with Fig. 1 whereupon fluid pressure is supplied under piston 111 to gradually lift the piston and move bushing 110a upward relatively to stem 106. With this arrangement, the bushing 110a is moved slowly back and forth relatively to stem 106. The arrangement is such that bushing 110a moves a distance substantially equal to that through which stem 106 moves to effect closing of the valve. Thus, the relatively moving rubbing parts of the valve are continuously moved back and forth over each other to prevent accumulation of foreign deposits on such parts. The arrangement is such that as long as valve 123 is closed, the pressure in pipe 115 is sufficient to maintain the circuit closer 131 open. As already explained, however, in case pressure in pipe 114 fails, then valve 123 is permitted to open to quickly dump the fluid pressure from under piston 111 and at the same time permit circuit closer 131 to close to sound an alarm or operate other device or devices connected in circuit 133. Also, should bushing 110a stick in its upward position then when valve 120 opens the fluid pressure will leak out from cylinder 112 relieving the pressure therein and in pipe 128 thus permitting the circuit closer 131 to operate to give an alarm to warn the station attendant of trouble.

What I claim as new and desire to secure by Letters Patent of the United States is:

1. In a valve operating mechanism, parts which slide one on the other when the valve elements move relatively to each other from open valve to closed valve position, and means operable while the valve elements are in open position for continuously moving one of said parts relatively to the other a distance equal substantially to that which said valve elements move relatively to each other when these elements move to closed valve position.

2. In a valve operating mechanism, parts which slide one on the other when the valve elements move from open valve to closed valve position, a piston connected to one of said parts, a cylinder for the piston, and means for supplying fluid pressure to said cylinder to effect while the valve element is in open position continuous reciprocating movement of said one part through a distance equal substantially to that which said elements move relatively to each other when the valve elements move to close valve position.

3. In a valve, parts which slide relatively to each other when the valve moves from open to closed position, a piston connected to one of said parts, a cylinder for the piston, means for supplying fluid pressure to said cylinder to effect while the valve is open continuous reciprocating movement of said one part through a distance equal substantially to that which said parts move relatively to each other when the valve moves to closed position, and means to effect quick release of the fluid pressure in said cylinder in case the fluid pressure supply fails.

4. In a valve, a valve disk, a valve seat, means for moving continuously while the valve is open said disk and seat in unison a distance equal substantially to that which the disk and seat must move relatively to each other to effect closing of the valve.

5. In a valve, a valve disk, a valve seat, means for moving continuously while the valve is open said disk and seat in unison a distance equal substantially to that which the disk and seat must move relatively to each other to effect closing of the valve, and means for maintaining the disk and seat normally separated by a predetermined amount.

6. In a valve, a valve disk, a valve seat, means for moving continuously while the valve is open said disk and seat in unison a distance equal substantially to that which the disk and seat must move relatively to each other to effect closing of the valve, means for maintaining the disk and seat normally separated by a predetermined amount, and means for effecting closing of the valve in case the disk and seat depart by more than a predetermined amount from their normally separated positions.

7. In a valve, a casing, valve stems projecting into the casing from opposite sides thereof, a disk on one of said stems, a seat on the other of said stems, means connected to said stems to effect continuous reciprocating movement of the stems in the same direction and during such movement to maintain the disk and seat separated by a predetermined amount, and means to effect closing of the valve by moving the disk and seat into engagement with each other.

8. In a valve, a casing, valve stems projecting into the casing from opposite sides thereof, a disk on one of said stems, a seat on the other of said stems, pistons and cylinders connected to said stems, means for supplying fluid pressure to said cylinders to effect continuous uniform reciprocation of said disk and seat in the same direction, means to maintain the disk and seat separated by a predetermined amount during such movement, and means to effect movement of the disk and seat into engagement with each other in case supply of fluid pressure fails.

MATTHEW O. TROY, Jr.